UNITED STATES PATENT OFFICE.

RUDOLF DORN, OF OMAHA, NEBRASKA.

MEDICAL COMPOUND FOR HORSES, &c.

SPECIFICATION forming part of Letters Patent No. 275,472, dated April 10, 1883.

Application filed January 30, 1883. (No specimens.)

*To all whom it may concern:*

Be it known that I, RUDOLF DORN, of Omaha, in the county of Douglas and State of Nebraska, have invented a Medical Compound for the Cure of Colic in Horses and Mules, named by me the "Universal Colic Cure," of which the following is a specification.

The ingredients with their proportions are: extract of henbane leaves, two ounces; tartar emetic, two and one-half ounces; chamomile flowers, two pounds. The chamomile flowers are well steeped in two quarts of boiling water, after which the water is drawn off and the extract of henbane and tartar emetic dissolved in the same.

The dose to be administered is one-fourth of the quantity given above, the doses to be repeated every half hour.

The proportions given are those preferred by me; but they may of course be varied somewhat. The dose may also be varied according to the violence of the disease by the exercise of proper discretion.

I am aware that extract of henbane has been used with tartar emetic, and also that infusion of chamomile has been used with tartar emetic and other ingredients as a febrifuge for stock, and I do not claim either of these compositions.

I claim as my invention—

The herein-described compound for the cure of colic in animals, consisting of extract of henbane leaves, tartar emetic, and chamomile flowers, in or about the proportions specified.

In testimony whereof I have hereunto subscribed my name this 22d day of January, A. D. 1883.

RUDOLF DORN.

Witnesses:
 CHAS. E. BURMESTER,
 D. MOERSTER.